R. C. NEWHOUSE.
LUBRICATING DEVICE FOR CHAIN PINS.
APPLICATION FILED MAY 25, 1918.

1,385,968. Patented July 26, 1921.

UNITED STATES PATENT OFFICE.

RAY C. NEWHOUSE, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE.

LUBRICATING DEVICE FOR CHAIN-PINS.

1,385,968.  Specification of Letters Patent.  Patented July 26, 1921.

Application filed May 25, 1918. Serial No. 236,945.

*To all whom it may concern:*

Be it known that I, RAY C. NEWHOUSE, a citizen of the United States, residing at Wauwatosa, in the county of Milwaukee and State of Wisconsin, have invented a certain new and useful Lubricating Device for Chain-Pins, of which the following is a specification.

This invention relates generally to improvements in the construction of conveyer chains and specifically to improvements in lubricating devices for chain pins.

An object of the invention is to provide a chain structure which is simple in construction and efficient in operation. A further object is to provide a lubricating device for chain pins, which is simple in structure and efficient in operation.

It has heretofore been customary to lubricate the pin and roller bearings of chain conveyers, by providing grease cups of ordinary formation having relatively thin threaded end portions, and securing one of these grease cups to the end of each pin by inserting the threaded cup end in a tapped opening in the pin communicating with the bearing surfaces. Due to the relatively small diameter of the chain pins, it required grease cups with relatively thin and weak shanks in order to permit attachment of the cups to the pins in this manner. By utilizing such grease cups in conveyers adapted to handle relatively coarse material, it has been found that in many instances, pieces of material falling alongside of the conveyer buckets or pans, would strike the grease cups and break them off.

In order to overcome this defect of the prior construction, the present invention contemplates elimination of these weak shanked grease cups and substitution therefor of grease caps co-acting directly with external threads formed on the ends of the pins. As the ends of the chain pins to which the grease cups are ordinarily attached, must be provided with standard threads of relatively coarse pitch adapted to receive clamping nuts for holding the chain together, and as it is desirable to have these grease caps co-act with relatively fine pitch threads in order to prevent their working off due to jarring of the chain, the present invention further contemplates the provision of threaded portions of different pitch adjacent the ends of the pins, the thread of finer pitch being directly adjacent the pin end and the thread of coarser pitch being between the fine pitch thread and the chain links.

The present invention also contemplates the provision of simple and efficient means for maintaining communication between the lubricant conveying ducts, so that lubricant may at all times be forced along the bearing surfaces.

A clear conception of an embodiment of the invention may be had by referring to the drawings accompanying and forming a part of this specification in which like reference characters designate the same or similar parts in the various views.

Figure 1:
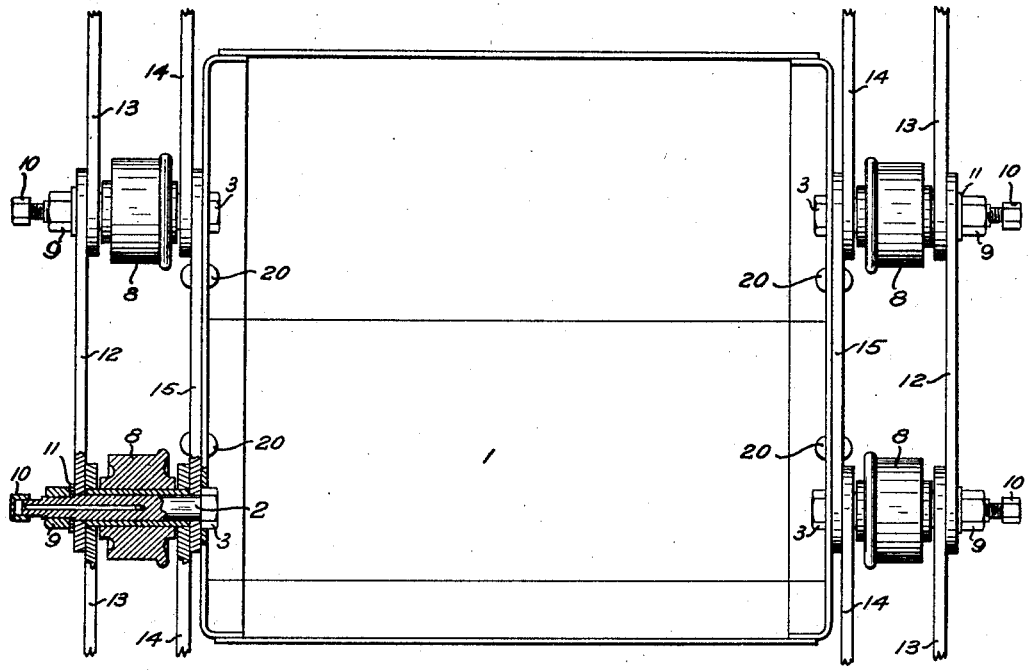
Figure 1 is a fragmentary, part-sectional top view of a bucket or pan conveyer.
Figure 2:
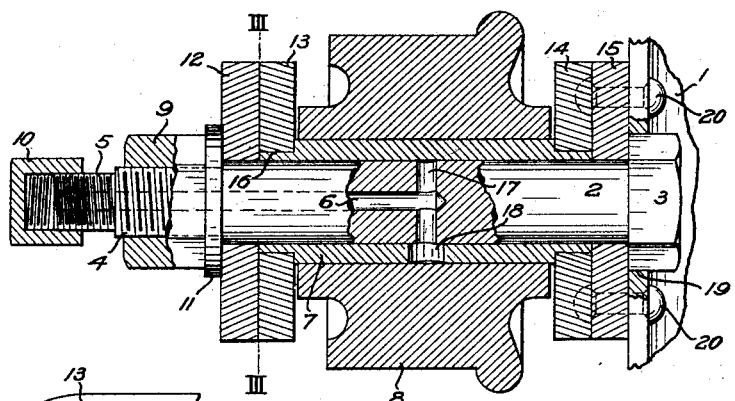
Fig. 2 is an enlarged transverse vertical section through the conveyer chain, the section being taken adjacent one of the chain pins.
Figure 3:
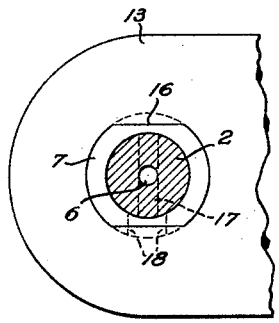
Fig. 3 is an enlarged fragmentary longitudinal vertical section through the conveyer chain, the section being taken along the line III—III of Fig. 2, looking toward the right.

The pan conveyer comprises generally an endless series of buckets or pans 1 associated with a pair of chains disposed on opposite sides of the pans and consisting of links 12, 13, 14, 15, bolts or pins 2, bushings 7 and rollers 8. The conveyer is advanced along rails of usual construction not shown, which normally co-act with the rollers 8, by means of sprocket wheels of usual construction not shown, the teeth of which also engage the rollers 8. While the invention is herein disclosed as applied to conveyer chains, it will be apparent that the various features thereof are also readily applicable to chains of other types.

Each of the conveyer chains is provided with alternate sets of outside links 12, 15 and inside links 13, 14. The links 15 are rigidly attached to the adjacent pans 1 by means of suitable connectors such as rivets 20. The pins 2 are provided with heads or portions 3 of prismatic formation which fit punched holes 19 in the side wall of the pan 1, thereby positively locking the pins 2 against rotative movement relatively to the links 15 and making the pins readily endwise removable. The outside links 12 on the opposite side of the chain, are restrained against relative rotative movement upon the pins 2 due to the fact that the two pins with which each of these links 12 engages, are locked against rotation relatively to each other by an adjacent conveyer pan 1.

The bushings 7 are bored to fit the pins 2 and have opposite end portions of prismatic formation provided with milled plane surfaces 16. These end bushing portions are fitted into openings in the adjacent inside links 13, 14 thus preventing relative rotative movement of the links 13, 14 and the co-acting bushing 7. While the inside links 13, 14 are fixed to the bushings 7 and the outside links 12, 15 are fixed relatively to the pins 2, the inside sets of links are nevertheless angularly movable relatively to the outside sets as the co-acting bushings 7 and the pins 2 constitute knuckle joints permitting such motion. The degree of this relative angular motion of the adjacent sets of inside and outside links is however limited by the conveyer guide rails and the diameters of the sprockets with which the chains co-act. The rollers 8 are freely rotatable upon the bushings 7 and are restrained from moving to any great extent longitudinally of the bushings 8 by means of the inside links 13, 14. The pins 2 and links 12, 13, 14, 15 are prevented from moving transversely away from the bushings 7 by means of the bolt heads 3, the washers 11 and the nuts 9 which co-act with standard coarse threads 4 formed on the pins 2. The washers 11 are clamped against shoulders on the pins 2 by means of the nuts 9 so as to allow working clearances for the chain links.

The bushings 7 are provided with lubricating passages or ducts 18 extending transversely from the roller bearings to the bored surfaces of the bushings 7. The pins 2 are provided with transverse through openings 17 communicating with the ducts 18 of the bushings 7, and with longitudinal central lubricant ducts 6 formed coaxial with the pins 2 and extending to the threaded ends thereof. The ends of the pins 2 adjacent the nuts 9, are slightly reduced in diameter and are provided with relatively fine threads 5 extending to the pin ends. Grease caps 10 having internal threads co-act with the fine threads 5 of the pins 2 and are adjustable thereon.

During normal operation of the conveyer the pans 1 and the conveyer chains are successively urged along their guide rails in the usual manner, the rollers 8 revolving upon the adjacent bushings 7. As the rollers 8 are engaged by the sprocket teeth, the chains bend about the pins 2, the sets of inside links 13, 14 during such bending moving angularly a slight amount relatively to the sets of outside links 12, 15. During this relative angular displacement of the successive sets of links, the bushings 7 have angular motion relatively to the adjacent pins 2. The angular displacement of the bushings and pins is however in no case sufficient to cut off communication between the openings 17 and the openings 18. This communication between the openings 17, 18 is positively maintained by virtue of the locking of the links 12, 15 relatively to the pins 2 and the locking of the links 13, 14 to the bushing 7.

If it is desired to replenish the supply of lubricant for the pins and bushing bearings, the grease caps 10 may be unscrewed and filled with grease after which they may be re-applied to the pin threads 5. As these conveyers are ordinarily operated at relatively slow speed, the supply of grease may be replenished without stopping the conveyer. By advancing the caps 10 along the threads 5 toward the chain links, grease is forced through the lubricating ducts 6, 17, 18 and along the various bearing surfaces of the pins 2, bushings 7 and rollers.

It will be noted that by forming the pins 2 with external threads and providing grease caps 10 fitting these threads, a grease cup structure of considerable strength is provided which will not be readily broken off by material hitting the same. By punching the metal of the pan so as to fit the head 3 of the pin 2, and riveting the pan to the adjacent link 15, the pin 2 is readily rigidly secured to the link 15 and may be readily removed or inserted. The links 13, 14 are also readily locked to the adjacent bushings 7 by providing the milled surfaces 16. The holes in the links 13, 14 may be readily formed by broaching and are preferably arranged with the surfaces 16 extending longitudinally of the links in order to maintain the greatest cross-sectional area of metal at these holes transversely of the links.

It should be understood that it is not desired to limit the invention to the exact details of construction herein shown and described for various modifications may occur to persons skilled in the art.

It is claimed and desired to secure by Letters Patent:—

1. In combination, a bushing having a bore and a flattened end, a chain link rigidly secured to said bushing at said end, a pin fitting said bore and having adjacent coarse and fine threaded portions at an end thereof, a second chain link rigidly secured to said pin, said links being relatively angularly movable, means for preventing relative transverse movement of said links in one direction, means associated with said coarse threaded portion of said pin for preventing relative transverse movement of said links in the opposite direction, and a lubricant cap associated with said fine threaded portion of said pin, said pin being adapted to conduct lubricant from said cap to said bore.

2. In combination, a bushing having a bore and a flattened end, a pin fitting said bore and having adjacent coarse and fine threaded portions at an end thereof, relatively angularly movable links rigidly secured to said bushing end and said pin respectively, a roller having a bearing upon said bushing, means for preventing relative transverse movement of said links in one direction, means associated with said coarse threaded portion of said pin for preventing relative transverse movement of said links in the opposite direction, and a lubricant container associated with said fine threaded portion of said pin, said pin being adapted to conduct lubricant from said container to said bore and to said roller bearing.

In testimony whereof the signature of the inventor is affixed hereto.

RAY C. NEWHOUSE.